(No Model.)
W. C. YEOMANS.
DEVICE FOR DRESSING THE TEETH OF SAWS.
No. 388,805. Patented Aug. 28, 1888.
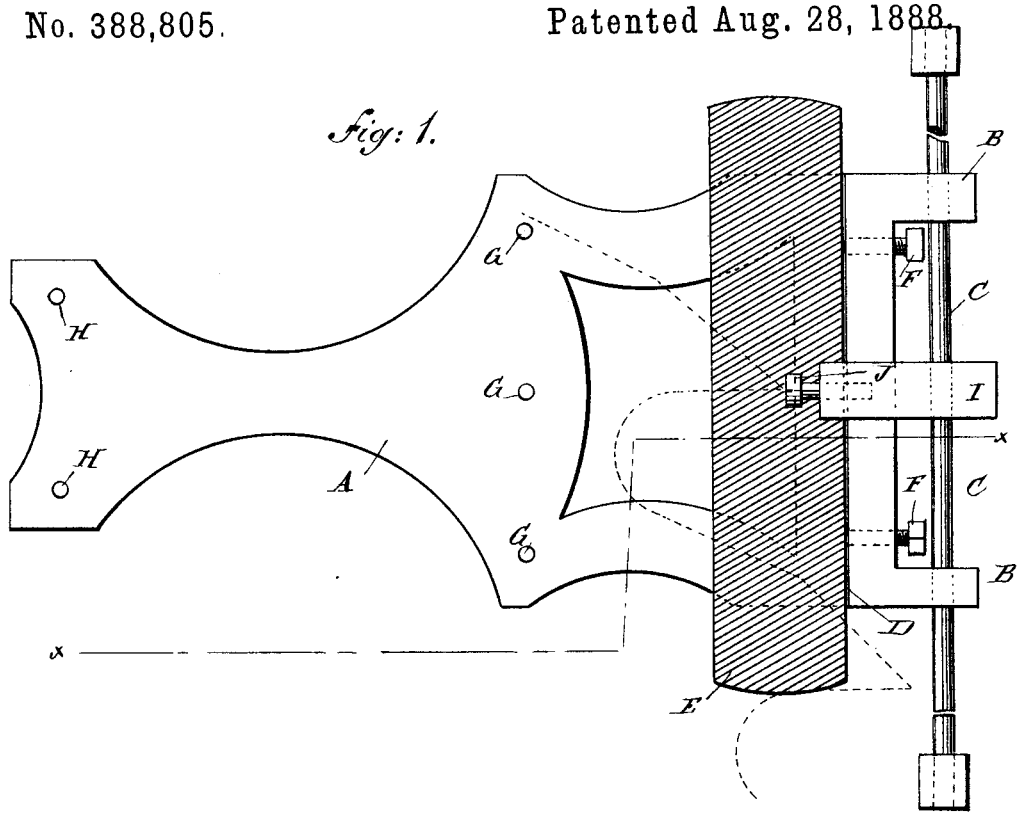
Fig: 1.
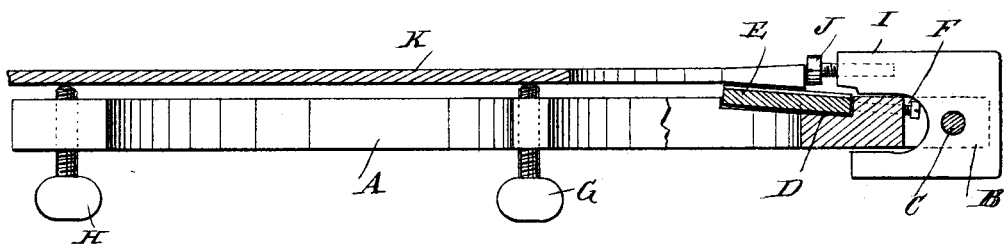
Fig: 2.
WITNESSES:
INVENTOR:
W. C. Yeomans
BY Munn & Co.
ATTORNEYS.

UNITED STATES PATENT OFFICE.

WALLACE C. YEOMANS, OF COUDERSPORT, PENNSYLVANIA.

DEVICE FOR DRESSING THE TEETH OF SAWS.

SPECIFICATION forming part of Letters Patent No. 388,805, dated August 28, 1888.

Application filed October 21, 1887. Serial No. 252,971. (No model.)

*To all whom it may concern:*

Be it known that I, WALLACE C. YEOMANS, of Coudersport, in the county of Potter and State of Pennsylvania, have invented a new and Improved Saw-Filing Implement, of which the following is a full, clear, and exact description.

The object of my invention is to provide a new and improved implement for side-dressing saw-teeth accurately on both sides to any desired angle, and so that the teeth will be widest at the point.

The invention consists of a frame adapted to slide and carrying a file, and a means for adjusting the frame to such a position in relation to the saw that said file stands at an angle to the saw-teeth.

The invention also consists of certain parts and details and combinations of the same, as will be fully described hereinafter, and then pointed out in the claims.

Reference is to be had to the accompanying drawings, forming a part of this specification, in which similar letters of reference indicate corresponding parts in both the figures.

Figure 1 is a plan view of my improvement, and Fig. 2 is a sectional side elevation of the same on the line $x\ x$ of Fig. 1.

The frame A, of suitable size and construction, is provided on one end with the lugs B, fitted loosely over a fixed rod or shaft, C, held in suitable bearings, and permitting a forward and backward sliding motion of said frame A. On top of the frame A is formed a groove, D, extending parallel with the fixed shaft C and slightly inclined. In this groove D is placed a file, E, of any approved construction, and held in said groove D by means of set-screws F, screwing in the frame A. In the frame A screw a row of set-screws, G, which pass through the frame, and are adapted to rest with their pointed ends against the body of the saw near the base of the tooth to be dressed. At the extreme outer end of the frame A are similar set-screws, H, by means of which, in connection with the set-screws G, the device may be adjusted in relation to the saw. On the fixed shaft C, between the lugs B B of the frame A, is securely held the guide-piece I, of suitable shape to permit the sliding movement of the frame A, and provided at its inner top end with a set-screw, J, against which rests the pointed end of the tooth to be filed.

The operation is as follows: The fixed shaft C is placed in such a position in relation to the saw K, as illustrated in Figs. 1 and 2, that the frame A is below the saw-blade K, and the set-screws G and H are then adjusted so as to bring the file E into the relative angle to which the saw-tooth is to be filed, as shown in Fig. 2. The operator then moves the frame A forward and backward on the fixed shaft C, so that the file E dresses one side of the tooth to the desired angle to which the frame A is set. By adjusting the set-screw J in or out as the file becomes worn the whole width of the file can be utilized.

The pointed ends of the set-screws G and H are held against the side of the saw-blade K, so that all the teeth of the saw are uniformly filed to the angle to which the file E is set. The other sides of the saw-teeth are filed either by reversing the saw-blade K or by placing the frame A on the other side of the saw-blade, in the same relative position as shown in Fig. 2.

Having thus fully described my invention, I claim as new and desire to secure by Letters Patent—

1. The combination, with a fixed rod or shaft, of a frame adapted to slide on said shaft, a file held in a recess in said frame, and set-screws screwing in said frame to regulate the angle of the file in relation to the teeth to be filed, substantially as shown and described.

2. The combination, with a fixed shaft and a gage secured to said shaft, of a frame adapted to slide on said shaft, a file held in a recess on said frame, and set-screws screwing in said frame and against the saw-blade, so as to regulate the angle of said file in relation to the teeth to be filed, substantially as shown and described.

3. The combination, with a fixed shaft, a guide-piece held on said shaft, and a set-screw screwing in said guide-piece, of a frame adapted to slide on said shaft and having a groove extending parallel with said shaft, a file held in said groove, and set-screws screwing in said frame and against the saw-blade to regulate the angle of the file in relation to the teeth of the saw, substantially as shown and described.

WALLACE C. YEOMANS.

Witnesses:
ARTHUR B. MANN,
WM. A. SHEAR.